(12) United States Patent
Hu et al.

(10) Patent No.: US 11,898,779 B2
(45) Date of Patent: Feb. 13, 2024

(54) SUBWAY HYBRID-ENERGY MULTIFUNCTIONAL-END-INTEGRATED HEAT PUMP SYSTEM AND METHOD

(71) Applicant: QINGDAO UNIVERSITY OF TECHNOLOGY, Shandong (CN)

(72) Inventors: Songtao Hu, Qingdao (CN); Guodan Liu, Qingdao (CN); Yongming Ji, Qingdao (CN); Haiying Wang, Qingdao (CN); Li Tong, Qingdao (CN); Zhen Tong, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 478 days.

(21) Appl. No.: 17/274,998

(22) PCT Filed: Jun. 3, 2020

(86) PCT No.: PCT/CN2020/094096
§ 371 (c)(1),
(2) Date: Mar. 10, 2021

(87) PCT Pub. No.: WO2021/017630
PCT Pub. Date: Feb. 4, 2021

(65) Prior Publication Data
US 2022/0034556 A1  Feb. 3, 2022

(30) Foreign Application Priority Data
Jul. 31, 2019 (CN) .......................... 201910704035.6

(51) Int. Cl.
*F25B 27/02* (2006.01)
*F24D 3/14* (2006.01)
(Continued)

(52) U.S. Cl.
CPC .............. *F25B 27/02* (2013.01); *B61K 13/00* (2013.01); *F24D 3/14* (2013.01); *F24D 19/1072* (2013.01); *F25B 27/002* (2013.01)

(58) Field of Classification Search
CPC .... F24D 11/0242; F24D 19/1072; F24D 3/14; F24T 50/00; F24T 10/10; F25B 27/002; F25B 27/02; B61K 13/00
See application file for complete search history.

(56) References Cited

U.S. PATENT DOCUMENTS 8,726,682 B1  5/2014  Olson

FOREIGN PATENT DOCUMENTS

AU  2018408667 A1 *  2/2020  .............. F24D 3/18
CN    102679624 A  *  9/2012
(Continued)

OTHER PUBLICATIONS

Aug. 28, 2020 Search Report issued in International Patent Application No. PCT/CN2020/094096.
(Continued)

*Primary Examiner* — Frantz F Jules
*Assistant Examiner* — Martha Tadesse
(74) *Attorney, Agent, or Firm* — Oliff PLC

(57) ABSTRACT

A subway hybrid-energy multifunctional-end-integrated heat pump system includes energy and user ends and hot water tank. A first energy end includes a capillary-tube front-end heat exchanger and a subway capillary heat pump unit. A second energy end includes a solar panel. A third energy end includes an air-cooled heat pump unit. The user end includes air conditioner, hot water supply, underfloor heating, and radiator heating ends. The first, second and third energy ends connect to the hot water tank. A water outlet is connected to the air conditioner, hot water supply, underfloor heating, and radiator heating ends. Water outlets
(Continued)

of the air conditioner, underfloor heating, and radiator heating ends are respectively connected to the first, second and third energy end through a return pipe.

9 Claims, 6 Drawing Sheets

(51) Int. Cl.
    *B61K 13/00*     (2006.01)
    *F25B 27/00*     (2006.01)
    *F24D 19/10*     (2006.01)

(56) References Cited

FOREIGN PATENT DOCUMENTS

| CN | 102679624 | A | | 9/2012 |
|---|---|---|---|---|
| CN | 202731926 | U | | 2/2013 |
| CN | 103615841 | A | * | 3/2014 |
| CN | 204141780 | U | | 2/2015 |
| CN | 105914863 | A | | 8/2016 |
| CN | 106051971 | A | | 10/2016 |
| CN | 106918104 | A | | 7/2017 |
| CN | 107631342 | A | | 1/2018 |
| CN | 108981229 | A | | 12/2018 |
| CN | 109099738 | A | | 12/2018 |
| CN | 110345667 | A | | 10/2019 |
| IN | 202008253 | U | | 10/2011 |
| JP | 2005-49016 | A | | 2/2005 |
| JP | 2016-84947 | A | | 5/2016 |
| KR | 20-2012-0005027 | U | | 7/2012 |

OTHER PUBLICATIONS

Aug. 28, 2020 Written Opinion of the International Searching Authority issued in International Patent Application No. PCT/CN2020/094096.

* cited by examiner

SUBWAY HYBRID-ENERGY MULTIFUNCTIONAL-END-INTEGRATED HEAT PUMP SYSTEM AND METHOD

BACKGROUND

Technical Field

The present invention relates to the field of hybrid-energy multifunctional-end-integrated systems, and in particular, to a subway hybrid-energy multifunctional-end-integrated heat pump system adopting a capillary-tube heat exchanger and a method.

Related Art

The background information is provided only to increase the understanding of the overall background of the present invention, but is not necessarily regarded as an acknowledgement or in any form suggesting that the information constitutes the prior art known to a person of ordinary skill in the art.

With the rapid development of economy and urbanization, the convenient and fast subway is increasingly popular. Subway construction is actively conducted in various big cities. The subway is now an indispensable vehicle for most people to go to work and out.

During subway operation, due to heat generated by train braking, locomotive air conditioners, and electromechanical equipment and the unique piston wind, a lot of waste heat exists in subway tunnels. Currently, a common practice is to dispose a cooling tower for cooling or adopt a ground-source heat pump. Due to above-ground space restrictions and urban aesthetic requirements and noise pollution and health hazards of cooling towers, cooling towers cannot be disposed liberally, and it is relatively difficult to drill for burying pipes of the ground-source heat pump.

Due to economic development and improved living standards, demands for energy are increasingly diversified. In addition to energy for heating and air conditioning, energy for domestic hot water is also indispensable. End equipment with different purposes have different requirements for energy. Currently, supply of the waste heat in subway tunnels to a multi-purpose end cannot be achieved.

SUMMARY

In view of the above problems in the prior art, an objective of the present invention is to provide a subway hybrid-energy multifunctional-end-integrated heat pump system and a method.

In order to solve the above technical problems, the technical solution of the present invention is:

a subway hybrid-energy multifunctional-end-integrated heat pump system. The system includes: an energy end, a user end, and a hot water storage tank, where a first energy end includes a capillary-tube front-end heat exchanger laid in surrounding rocks of a tunnel and a subway capillary-tube heat pump unit, a second energy end includes a solar panel, a third energy end includes an air-cooled heat pump unit, the user end includes an air conditioner end, a hot water supply end, an underfloor heating end, and a radiator heating end, the first energy end, the second energy end, and the third energy end are connected to a water inlet of the hot water storage tank, a water outlet of the hot water storage tank is connected to the air conditioner end, the hot water supply end, the underfloor heating end, and the radiator heating end, water outlets of the air conditioner end, the underfloor heating end, and the radiator heating end are connected to the hot water storage tank through a first return pipe, the water outlet of the air conditioner end is connected to the third energy end through a second return pipe, and the third energy end is connected to the air conditioner end through a cooling pipe.

According to the technical solution of the present invention, the capillary-tube heat exchanger is used to resolve heat accumulation in the subway tunnel, and the waste heat is fully utilized. The waste heat in the subway tunnel is combined with solar energy and air energy to form hybrid energy, and supply of hybrid energy to a multi-purpose end is implemented through pipeline connection. The first energy end uses the waste heat in the subway tunnel, the second energy end uses the solar energy, and the third energy end uses the air energy. The plurality of purposes that can be realized include air conditioning, supply of hot water, floor heating, and radiator heating. In winter, the heat generated by the three energy ends is converted into hot water, and the hot water enters the hot water storage tank and then enters each of the user ends for heat exchange.

The above energy supply process may be regulated according to four seasons. In addition, the air-cooled heat pump unit can be independently connected to the air-conditioning user end to supply cold energy in summer.

The above energy supply process achieves recycling of water. The water after heat exchange at the user end is circulated back to the energy end for another energy recycle.

In some embodiments, the first energy end further includes a first circulating water pump, a second circulating water pump, a first valve, and a second valve, an outlet of the capillary-tube front-end heat exchanger is connected to the subway capillary-tube heat pump unit through the first circulating water pump and the first valve, and the hot water storage tank is connected to the subway capillary-tube heat pump unit through the second circulating water pump and the second valve.

In some embodiments, the second energy end further includes a third circulating water pump, a third valve, and a fourth valve, and the solar panel is connected to the hot water storage tank through the third valve, the fourth valve, and the third circulating water pump.

In some embodiments, the third energy end further includes a fourth circulating water pump, a fifth circulating water pump, a fifth valve, a sixth valve, a seventh valve, an eighth valve, a ninth valve, and a tenth valve, the air-cooled heat pump unit is connected to the hot water storage tank through the fifth valve, the sixth valve, and the fourth circulating water pump, and to the air conditioner end through the seventh valve, the eighth valve, the ninth valve, and the fifth circulating water pump, and the air conditioner end is connected to the hot water storage tank through the tenth valve.

In some embodiments, the hot water storage tank is connected to the air conditioner end through a sixth circulating water pump and an eleventh valve, to the hot water supply end through a seventh circulating water pump and a twelfth valve, to the underfloor heating end through an eighth circulating water pump and a thirteenth valve, and to the radiator heating end through a ninth circulating water pump and a fourteenth valve.

In some embodiments, make-up water is connected to the first energy end, the second energy end, and the third energy end through a tenth circulating water pump and a fifteenth valve.

In some embodiments, the subway hybrid-energy multifunctional-end-integrated heat pump system further includes a control system. The control system includes a temperature monitor, a water level monitor, a valve controller, a unit controller, a water pump controller, and a central processing device, where the temperature monitor is provided at an outlet of the solar panel and the outlet of the hot water storage tank, the water level monitor is provided in the hot water storage tank, the valve controller is provided at a first valve to a sixteenth valve, the unit controller is provided at the air-cooled heat pump unit, the water pump controller is provided at a first water pump to an eleventh water pump, and the temperature monitor, the water level monitor, the valve controller, the unit controller, and the water pump controller are connected to the central processing device.

The temperature monitor transmits monitored temperature information to the central processing device, and the central processing device controls different valves, units, and water pumps according to feedback information. The water level monitor monitors water level information of the hot water storage tank in real time and transmits the information to the central processing device, and the central processing device controls the make-up pump and related valves according to a situation.

In some embodiments, capillary tubes of the capillary-tube front-end heat exchanger are spaced from each other by a distance of 10 mm, the capillary tubes are laid between a first lining and a second lining of the surrounding rocks of the subway tunnel, a waterproof board is laid between the capillary tubes and the second lining, and each of the capillary tubes has a flow rate of 0.05-0.2 m/s.

A method for supplying energy from the subway hybrid-energy multifunctional-end-integrated heat pump system specifically includes the steps of:

turning on the first valve to allow the subway capillary-tube heat pump unit to absorb waste heat from a subway tunnel to heat hot water to generate hot water, turning on the second valve to allow the hot water to enter the hot water storage tank, and turning on the twelfth valve and the seventh circulating water pump;

in summer, controlling, by the central processing device, corresponding controllers to turn on the seventh valve, the eighth valve, the ninth valve, and the fifth circulating water pump to allow the air-cooled heat pump unit to supply cold energy to the air conditioner end; controlling, by the central processing device, corresponding controllers to turn on the third circulating water pump, the third valve, and the fourth valve to allow circulating water in the hot water storage tank to flow back to the solar panel and the subway capillary-tube heat pump unit to absorb solar energy and the subway waste heat, when a water temperature at the outlet of the solar panel is greater than or equal to 60° C.; controlling, by the central processing device, the corresponding controllers to turn off the third valve, the fourth valve, and the third circulating water pump to allow the circulating water in the hot water storage tank to flow back to the subway capillary-tube heat pump unit to be heated by the subway waste heat to supply hot water to the hot water supply end, if the water temperature at the outlet of the solar panel is less than 60° C.;

in winter, turning on the thirteenth valve, the fourteenth valve, the eighth circulating water pump, and the ninth circulating water pump, and controlling, by the central processing device, the corresponding controllers to turn off the seventh valve, the eighth valve, the ninth valve, and the fifth circulating water pump; controlling, by the central processing device, the corresponding controllers to turn on the third valve, the fourth valve, and the third circulating water pump to allow the circulating water in the hot water storage tank to flow back to the solar panel and the subway capillary-tube heat pump unit to absorb the solar energy and the subway waste heat, when a water temperature at the outlet of the hot water storage tank is less than 60° C. and if the water temperature at the outlet of the solar panel is greater than or equal to 60° C. as monitored by the temperature monitor at the outlet; controlling, by the central processing device, corresponding controllers to turn on the fifth valve, the sixth valve, and the fourth circulating water pump to allow the circulating water in the hot water storage tank to flow back to the air-cooled heat pump unit, the solar panel, and the subway capillary-tube heat pump unit such that the three energy ends jointly supply heat to the air conditioner end, the hot water supply end, the underfloor heating end, and the radiator heating end, if at this point the water temperature at the outlet of the hot water storage tank is still less than 60° C.; controlling, by the central processing device, the corresponding controllers to turn on the fifth valve, the sixth valve, and the fourth circulating water pump and turn off the third valve, the fourth valve, and the third circulating water pump to allow the circulating water to flow back to the air-cooled heat pump unit and the subway capillary-tube heat pump unit such that the first energy end and the third energy end supply heat to the multifunctional end, if the water temperature at the outlet of the solar panel is less than 60° C. as monitored by the temperature monitor at the outlet;

in a transition season, controlling, by the central processing device, the corresponding controllers to turn off the seventh valve, the eighth valve, the ninth valve, the thirteenth valve, the fourteenth valve, the fifth circulating water pump, the eighth circulating water pump, and the ninth circulating water pump; controlling, by the central processing device, the corresponding controllers to turn off the third valve, the fourth valve, and the third circulating water pump, if the water temperature at the outlet of the solar panel is less than 60° C. as monitored by the temperature monitor at the outlet, and controlling, by the central processing device, the corresponding controllers to turn on the fifth valve, the sixth valve, and the fourth circulating water pump to allow the circulating water in the hot water storage tank to flow back to the air-cooled heat pump unit and the subway capillary-tube heat pump unit such that the first energy end and the third energy end supply heat, if at this point the water temperature at the outlet of the hot water storage tank is less than 60° C.; controlling, by the central processing device, the corresponding controllers to turn off the fifth valve, the sixth valve, and the fourth circulating water pump to allow the circulating water in the hot water storage tank to flow back to the subway capillary-tube heat pump unit such that the first energy end supplies heat, if at this point the water temperature at the outlet of the hot water storage tank is greater than 60° C.; and controlling, by the central processing device, the corresponding controllers to turn on the third valve, the fourth valve, and the third circulating water pump to allow the circulating water in the hot water storage tank to flow back to the solar panel and the subway capillary-tube heat pump unit such that the first energy end and the second energy end supply heat, if the water temperature at the outlet of the solar panel is greater than or equal to 60° C. as monitored by the temperature monitor of the solar panel.

The subway capillary-tube heat pump unit needs to operate all year round to cool the subway tunnel.

In some embodiments, if the water temperature at the outlet of the hot water storage tank is greater than 60° C. as monitored by the temperature monitor at the outlet, the central processing device controls corresponding controllers to turn on the eleventh circulating water pump and the sixteenth valve; if the water temperature at the outlet of the hot water storage tank is less than or equal to equal to 60° C. as monitored by the temperature monitor at the outlet, the central processing device controls the corresponding controllers to turn off the eleventh circulating water pump and the sixteenth valve;

a corresponding flow rate is adjusted according to different outlet water temperatures to maintain a temperature of water entering end user equipment at 60° C.; and the eleventh circulating water pump and the sixteenth valve are turned off if the water temperature at the outlet of the hot water storage tank is equal to 60° C.

In some embodiments, if a water level of the hot water storage tank is less than a set value, the central processing device controls corresponding controller to turn on a tenth circulating water pump and a fifteenth valve.

The present invention has the beneficial effects:

The present invention overcomes restrictions on disposing a conventional cooling tower and difficulty in drilling for burying pipes of the ground-source heat pump existing in cooling of subway tunnels, and is combined with auxiliary cold and heat sources to form a hybrid-energy system, which not only effectively solves heat accumulation in subway tunnels, but also meets cold and heat demands of the multi-purpose end in different seasons, and has high heat utilization and is environmentally-friendly, economical, and efficient.

BRIEF DESCRIPTION OF THE DRAWINGS

The accompanying drawings of the specification forming a part of the present invention are used to provide further understanding of the present invention, and the exemplary embodiments of the present invention and descriptions thereof are used to explain the present invention but do not constitute an improper limitation on the present invention.

1. Capillary-tube front-end heat exchanger, 2. Subway capillary-tube heat pump unit, 3. Solar panel, 4. Air-cooled heat pump unit, 5. Hot water storage tank, 6. Air conditioner end, 7. Hot water supply end, 8. Underfloor heating end, 9. Radiator heating end, 10. First circulating water pump, 11. Second circulating water pump, 12. Third circulating water pump, 13. Fourth circulating water pump, 14. Fifth circulating water pump, 15. Sixth circulating water pump, 16. Seventh circulating water pump, 17. Eighth circulating water pump, 18. Ninth circulating water pump, 19. Tenth circulating water pump, 20. Eleventh circulating water pump, 21. First valve, 22. Second valve, 23. Third valve, 24. Fourth valve, 25. Fifth valve, 26. Sixth valve, 27. Seventh valve, 28. Eighth valve, 29. Ninth valve, 30. Tenth valve, 31. Eleventh valve, 32. Twelfth valve, 33. Thirteenth valve, 34. Fourteenth valve, 35. Fifteenth valve, 36. Sixteenth valve.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present disclosure belongs.

It should be noted that the terms used herein are merely for describing specific implementations, and are not intended to limit exemplary implementations according to this application. As used herein, the singular form is also intended to include the plural form unless the context clearly dictates otherwise. In addition, it should be further understood that, terms "comprise" and/or "include" used in this specification indicate that there are features, steps, operations, devices, components, and/or combinations thereof.

The present invention is further described below with reference to the embodiments.

Embodiment 1

Figure 1:
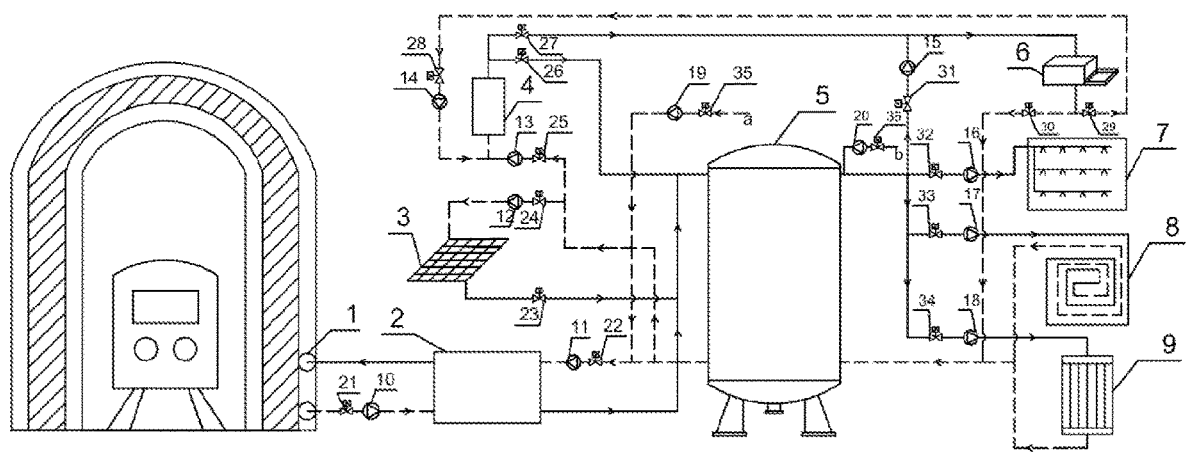
FIG. 1 is a schematic structural diagram of a subway hybrid-energy multifunctional-end-integrated heat pump system according to the present invention.

As shown in FIG. 1, a subway hybrid-energy multifunctional-end-integrated heat pump system adopting a capillary-tube heat exchanger includes: an energy end, a user end, and a hot water storage tank 5. A first energy end includes a capillary-tube front-end heat exchanger 1 laid in the surrounding rocks of a tunnel and a subway capillary-tube heat pump unit 2, a second energy end includes a solar panel 3, and a third energy end includes an air-cooled heat pump unit 4. The user end includes an air conditioner end 6, a hot water supply end 7, an underfloor heating end 8, and a radiator heating end 9. The first energy end, the second energy end, and the third energy end are connected to a water inlet of the hot water storage tank 5, and a water outlet of the hot water storage tank 5 is connected to the air conditioner end 6, the hot water supply end 7, the underfloor heating end 8, and the radiator heating end 9. Water outlets of the air conditioner end 6, the underfloor heating end 8, and the radiator heating end 9 are connected to the hot water storage tank 5 through a first return pipe, and the air conditioner end 6 is connected to the third energy end through a second return pipe.

Further, the first energy end further includes a first circulating water pump 10, a second circulating water pump 11, a first valve 21, and a second valve 22. An outlet of the capillary-tube front-end heat exchanger 1 is connected to the subway capillary-tube heat pump unit 2 through the first circulating water pump 10 and the first valve 21, and the hot water storage tank 5 is connected to the subway capillary-tube heat pump unit 2 through the second circulating water pump 11 and the second valve 22.

Further, the second energy end further includes a third circulating water pump 12, a third valve 23, and a fourth valve 24. The solar panel 3 is connected to the hot water storage tank 5 through the third valve 23, the fourth valve 24, and the third circulating water pump 12.

Further, the third energy end further includes a fourth circulating water pump 13, a fifth circulating water pump 14, a fifth valve 25, a sixth valve 26, a seventh valve 27, an eighth valve 28, a ninth valve 29, and a tenth valve 30. The air-cooled heat pump unit is connected to the hot water storage tank 5 through the fourth circulating water pump 13, the fifth valve 25, and the sixth valve 26. The air-cooled heat pump unit 4 is connected to the air conditioner end 6 through the seventh valve 27, the eighth valve 28, the ninth valve 29, and the fifth circulating water pump 14. The air conditioner end 6 is connected to the hot water storage tank 5 through the tenth valve 30.

Further, the hot water storage tank 5 is connected to the air conditioner end 6 through a sixth circulating water pump 15 and an eleventh valve 31. The hot water storage tank 5 is connected to the hot water supply end 7 through a seventh circulating water pump 16 and a twelfth valve 32. The hot water storage tank 5 is connected to the underfloor heating end 8 through an eighth circulating water pump 17 and a thirteenth valve 33, and the hot water storage tank 5 is connected to the radiator heating end 9 through a ninth circulating water pump 18 and a fourteenth valve 34.

Further, make-up water is connected to the first energy end, the second energy end, and the third energy end through a tenth circulating water pump 19 and a fifteenth valve 35, respectively.

Further, the subway hybrid-energy multifunctional-end-integrated heat pump system further includes a control system. The control system includes a temperature monitor, a water level monitor, a valve controller, a unit controller, a water pump controller, and a central processing device, where the temperature monitor is provided at an outlet of the solar panel and the outlet of the hot water storage tank, the water level monitor is provided in the hot water storage tank, the valve controller is provided at a first valve to a sixteenth valve, the unit controller is provided at the air-cooled heat pump unit, the water pump controller is provided at a first water pump to an eleventh water pump, and the temperature monitor, the water level monitor, the valve controller, the unit controller, and the water pump controller are connected to the central processing device.

Further, capillary tubes of the capillary-tube front-end heat exchanger are spaced from each other by a distance of 10 mm, the capillary tubes are laid between a first lining and a second lining of the surrounding rocks of the subway tunnel, and a waterproof board is laid between the capillary tubes and the second lining. Each of the capillary tubes has a flow rate of 0.05-0.2 m/s. The capillary tube has a size of 4.3×0.85 mm. The tube is a ppr tube or a pe-rt tube, and a flowing state in the capillary tube is a laminar flow.

Embodiment 2

A method for supplying energy from the subway hybrid-energy multifunctional-end-integrated heat pump system of Embodiment 1 is provided.

Figure 2:
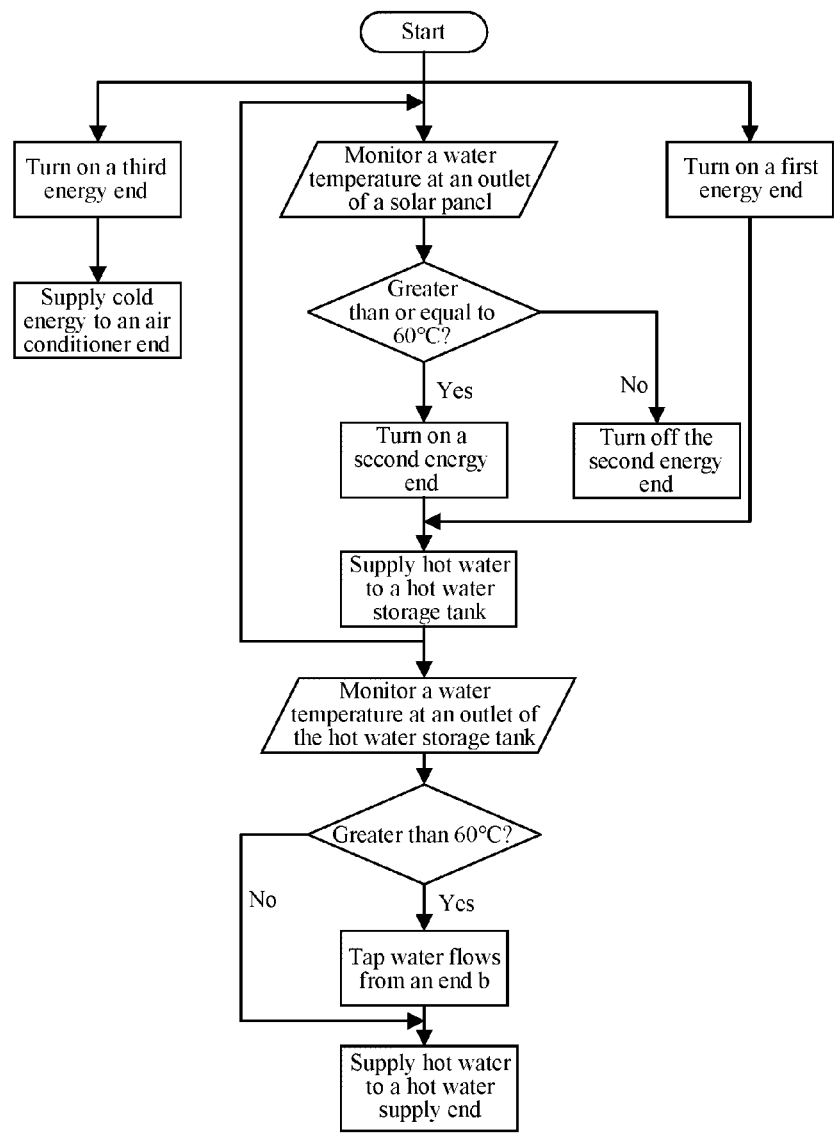
FIG. 2 is a flowchart of an operating condition in summer according to the present invention.

As shown in FIG. 2, an operating condition in summer is turning on a first valve 21, a second valve 22, a seventh valve 27, an eighth valve 28, a ninth valve 29, and a twelfth valve 32. A subway capillary-tube heat pump unit 2 absorbs heat from surrounding rocks and soil and air heat in a subway station through a capillary-tube front-end heat exchanger 1. The subway capillary-tube heat pump unit 2 prepares hot water while cooling a tunnel, and delivers the hot water to a hot water storage tank 5 through a pipeline. A solar panel 3 heats the hot water by means of obtained solar radiation energy. An air conditioner end 6 in the subway station needs to provide cold energy in summer. An air-cooled heat pump unit 4 supplies cold energy to the air conditioner end 6 in the subway station through a seventh valve 27, an eighth valve 28, a ninth valve 29, and a fifth circulating water pump 14. If a water temperature at the outlet is less than 60° C. as monitored by a temperature monitor at an outlet of the solar panel 3, temperature information is transmitted to a central processing device. The central processing device controls corresponding controllers to turn off a third circulating water pump 12, a third valve 23, and the fourth valve 24, and the subway capillary-tube heat pump unit 2 supplies hot water to the hot water storage tank 5 alone. If the water temperature at the outlet of the solar panel 3 is greater than or equal to 60° C. as monitored, the central processing device controls corresponding controllers to turn on the third circulating water pump 12, the third valve 23, and the fourth valve 24, to allow the subway capillary-tube heat pump unit 2 and the solar panel 3 to jointly supply hot water to the hot water storage tank 5.

Figure 3:
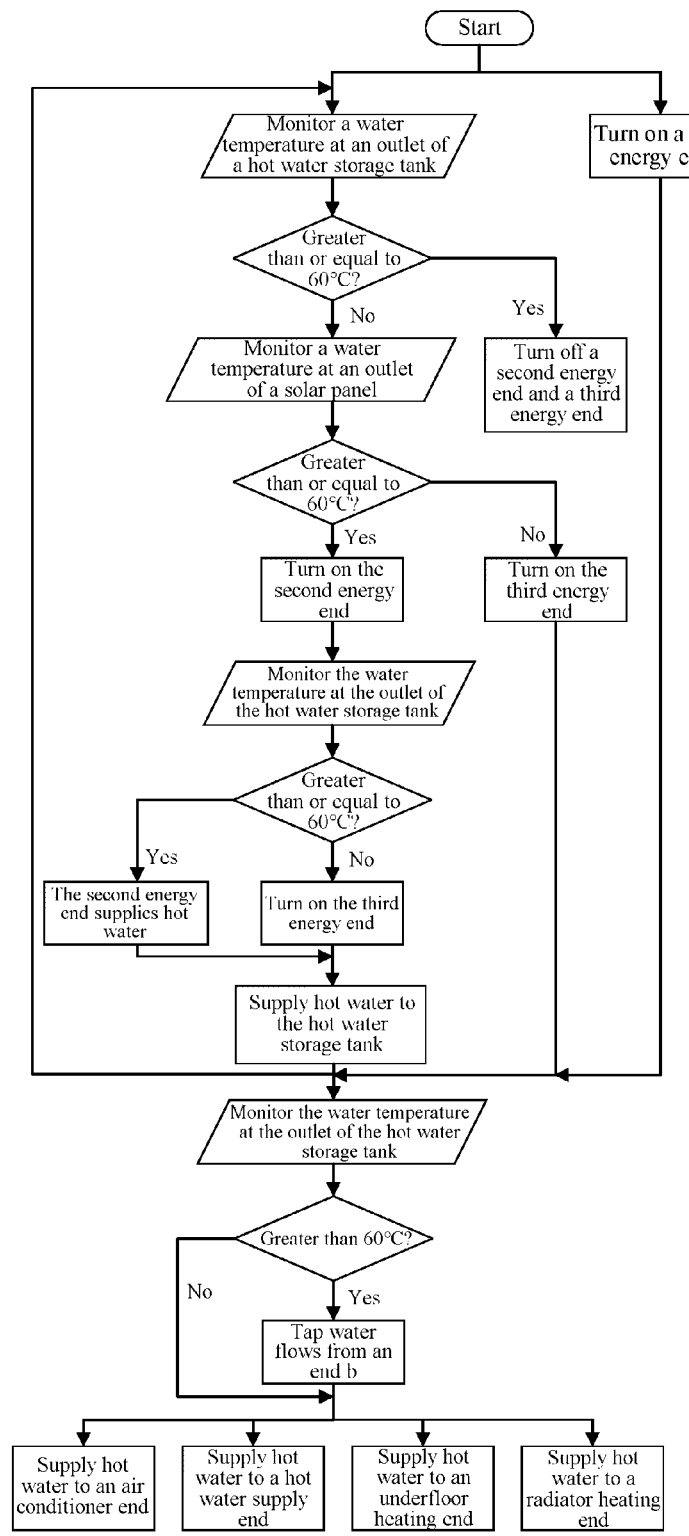
FIG. 3 is a flowchart of an operating condition in winter according to the present invention.

As shown in FIG. 3, an operating condition in winter is: turning on a first valve 21, a second valve 22, a tenth valve 30, an eleventh valve 31, a twelfth valve 32, a thirteenth valve 33, and a fourteenth valve 34. In this case, all of the air conditioner end 6, a hot water supply user end 7, an underfloor heating user end 8, and a radiator heating user end 9 require hot water, imposing a great demand for heat. The subway capillary-tube heat pump unit 2 keeps operating to not only cool the tunnel but also provide heat for end users. If the heat supply is insufficient, that is, if a water temperature at the outlet is less than 60° C. as monitored by a temperature monitor at an outlet of the hot water storage tank 5, the solar panel 3 or the air-cooled heat pump unit 4 needs to be turned on. If the water temperature at the outlet is greater than or equal to 60° C. as monitored by the temperature monitor at the outlet of the solar panel 3, the central processing device controls corresponding controllers to turn on the third valve 23, the fourth valve 24, and the third circulating water pump 12. If at this point the water temperature at the outlet of the hot water storage tank 5 is still less than 60° C., the air-cooled heat pump unit 4 is also turned on. Specifically, the air-cooled heat pump unit is turned on by opening a fifth valve 25, a sixth valve 26, and a fourth circulating water pump 13. If the water temperature at the outlet is less than 60° C. as monitored by the temperature monitor at the outlet of the solar panel 3, the air-cooled heat pump unit 4 is turned on.

Figure 4:
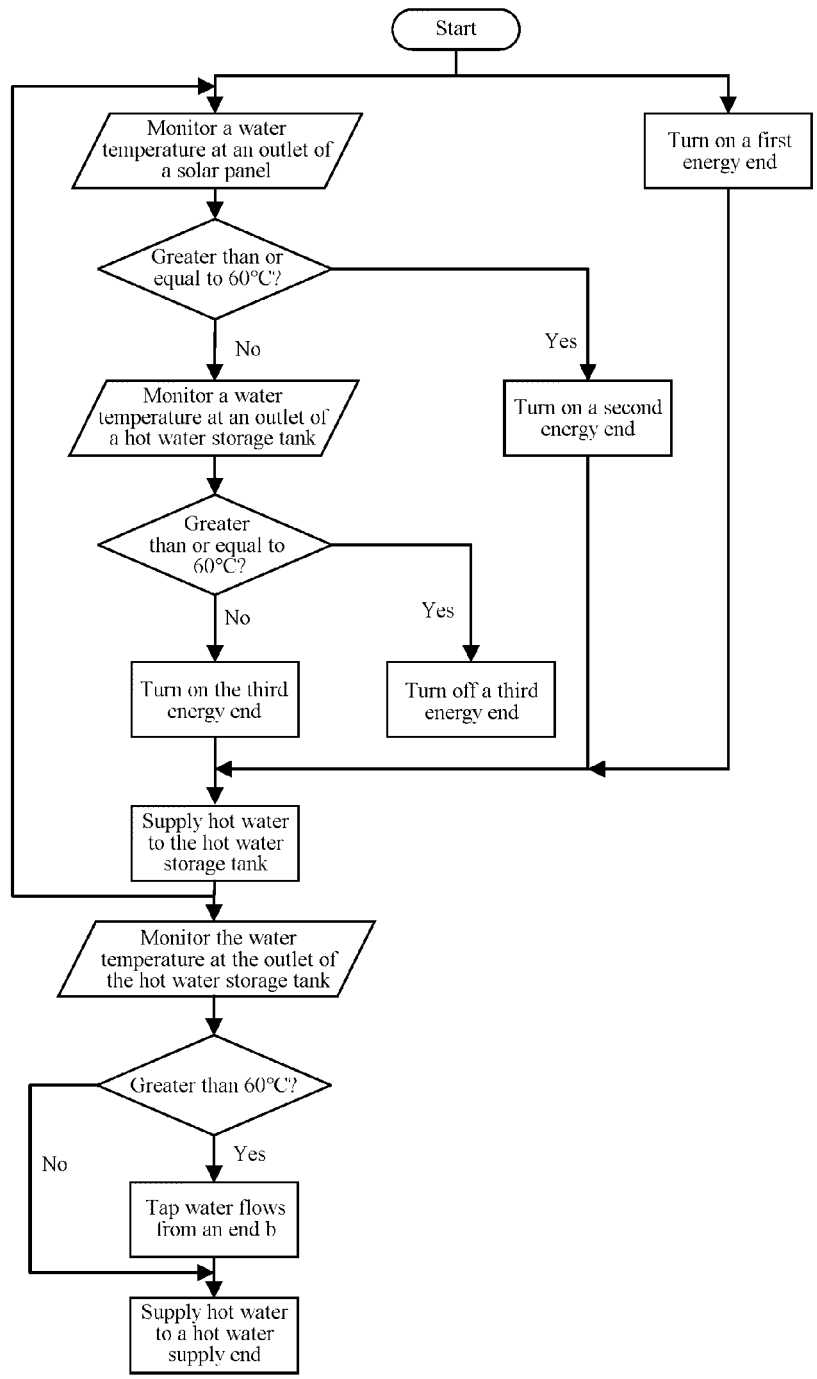
FIG. 4 is a flowchart of an operating condition in a transition season according to the present invention.

As shown in FIG. 4, an operating condition in a transition season is turning on a first valve 21, a second valve 22, and a twelfth valve 32. During the transition season, only the hot water supply user end 7 has a demand for heat. Therefore, the subway capillary-tube heat pump unit 2 is turned on to not only cool the subway but also supply heat to the hot water supply end 7. In addition, if the water temperature at the outlet is less than 60° C. as monitored by the temperature monitor of the solar panel 3, it is determined, according to whether the water temperature monitored by the temperature monitor at the outlet of the hot water storage tank 5 is less than 60° C., whether to turn on the air-cooled heat pump unit 4. If the water temperature is less than 60° C., the air-cooled heat pump unit 4 is turned on. If the water temperature is greater than or equal to 60° C., only the subway capillary-tube heat pump unit 2 needs to supply water to meet the heat demand of the hot water supply end 7. If the water temperature at the outlet is greater than or equal to 60° C. as monitored by the temperature monitor of the solar panel 3, the solar panel 3 is turned on.

If the water temperature at the outlet is greater than 60° C. as monitored by the temperature monitor at the outlet of the hot water storage tank 5, the central processing device controls corresponding controllers to turn on an eleventh circulating water pump 20 and a sixteenth valve 36, and adjusts a tap water inflow at an end b according to different outlet water temperatures, to maintain a temperature of water entering the end user equipment at 60° C. If the water temperature at the outlet of the hot water storage tank 5 is equal to 60° C., the eleventh circulating water pump 20 and the sixteenth valve 36 are turned off.

The water level monitor transmits water level information of the hot water storage tank 5 to the central processing device. If a water level is less than a set value, a tenth circulating water pump 19 and a fifteenth valve 35 are turned on to replenish the system with water.

Figure 5:
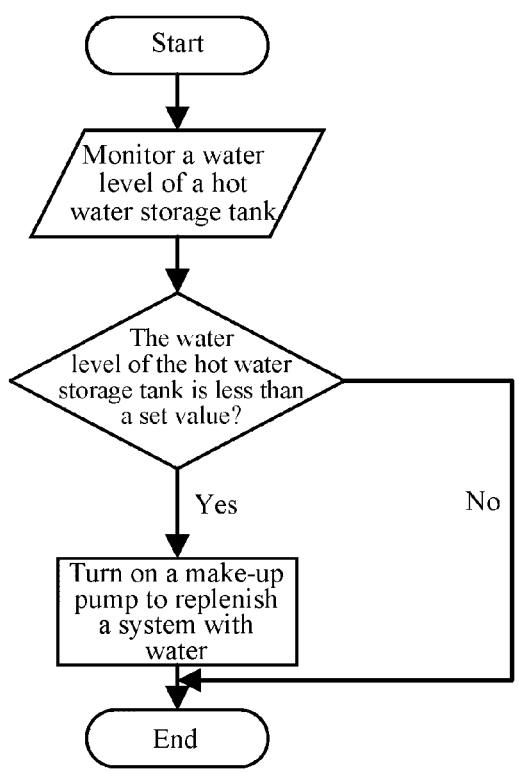
FIG. 5 is an operation flowchart of a make-up water pump according to the present invention.

FIG. 5 is an operation flowchart of a make-up water pump of a subway hybrid-energy multifunctional-end-integrated heat pump system according to the present invention. The make-up water pump is the tenth circulating water pump 19. When the water level of the hot water storage tank is less ththe set value, the central processing device controls the tenth circulating water pump 19 to be turned on to replenish the hot water storage tank with water. If the water level of the hot water storage tank is not less ththe set value, the tenth circulating water pump 19 is turned off.

Figure 6:
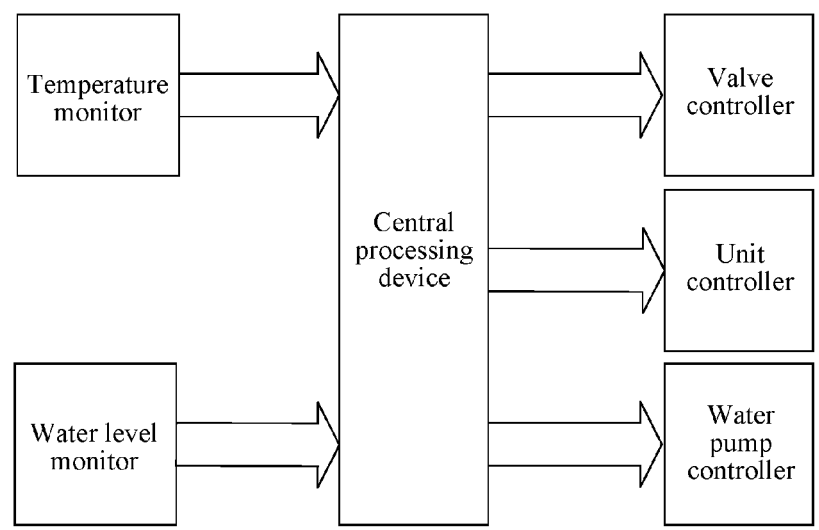
FIG. 6 is a schematic structural diagram of a control system according to the present invention.

As shown in FIG. 6, the central processing device respectively controls valve controllers of the first valve to the sixteenth valve, unit controllers of the subway capillary-tube heat pump unit and the air-cooled heat pump unit, and pump controllers of the first circulating water pump to the eleventh circulating water pump according to information obtained by the temperature monitor and the water level monitor.

The above descriptions are merely preferred embodiments of the present invention and are not intended to limit the present invention. Those skilled in the art may make various modifications and changes to the present invention. Any modification, equivalent replacement, or improvement made within the spirit and principle of the present invention shall fall within the protection scope of the present invention.

What is claimed is:

1. A subway hybrid-energy multifunctional-end-integrated heat pump system adopting a capillary-tube heat exchanger, the system comprising: an energy end, a user end, a hot water storage and a control system, wherein the energy end comprises a first energy end, a second energy end and a third energy end, the first energy end comprises a capillary-tube front-end heat exchanger laid in surrounding rocks of a tunnel and a subway capillary-tube heat pump unit, the second energy end comprises a solar panel, the third energy end comprises an air-cooled heat pump unit, the user end comprises an air conditioner end, a hot water supply end, an underfloor heating end, and a radiator heating end, the first energy end, the second energy end, and the third energy end are connected to a water inlet of the hot water storage tank, a water outlet of the hot water storage tank is connected to the air conditioner end, the hot water supply end, the underfloor heating end, and the radiator heating end, water outlets of the air conditioner end, the underfloor heating end, and the radiator heating end are connected to the hot water storage tank through a first return pipe, the water outlet of the air conditioner end is connected to the third energy end through a second return pipe, and the third energy end is connected to the air conditioner end through a cooling pipe; and wherein the control system comprising a temperature monitor, a water level monitor, a valve controller, a unit controller, a water pump controller, and a central processing device, wherein the temperature monitor is provided at an outlet of the solar panel and an outlet of the hot water storage tank, the water level monitor is provided in the hot water storage tank, the valve controller is provided at a first valve to a sixteenth valve, the unit controller is provided at the air-cooled heat pump unit, the water pump controller is provided at a first circulating water pump to an eleventh circulating water pump, and the temperature monitor, the water level monitor, the valve controller, the unit controller, and the water pump controller are connected to the central processing device.

2. The system according to claim 1, wherein the first energy end further comprises a first circulating water pump, a second circulating water pump, a first valve, and a second valve, an outlet of the capillary-tube front-end heat exchanger is connected to the subway capillary-tube heat pump unit through the first circulating water pump and the first valve, and the hot water storage tank is connected to the subway capillary-tube heat pump unit through the second circulating water pump and the second valve.

3. The system according to claim 1, wherein the second energy end further comprises a third circulating water pump, a third valve, and a fourth valve, and the solar panel is connected to the hot water storage tank through the third valve, the fourth valve, and the third circulating water pump.

4. The system according to claim 1, wherein the third energy end further comprises a fourth circulating water pump, a fifth circulating water pump, a fifth valve, a sixth valve, a seventh valve, an eighth valve, a ninth valve, and a tenth valve, the air-cooled heat pump unit is connected to the hot water storage tank through the fifth valve, the sixth valve, and the fourth circulating water pump, and to the air conditioner end through the seventh valve, the eighth valve, the ninth valve, and the fifth circulating water pump, and the air conditioner end is connected to the hot water storage tank through the tenth valve.

5. The heat pump system according to claim 4, wherein the hot water storage tank is connected to the air conditioner end through a sixth circulating water pump and an eleventh valve, to the hot water supply end through a seventh circulating water pump and a twelfth valve, to the underfloor heating end through an eighth circulating water pump and a thirteenth valve, and to the radiator heating end through a ninth circulating water pump and a fourteenth valve.

6. The system according to claim 5, wherein make-up water is connected to the first energy end, the second energy end, and the third energy end through a tenth circulating water pump and a fifteenth valve.

7. The system according to claim 1, wherein capillary tubes of the capillary-tube front-end heat exchanger are spaced from each other by a distance of 10 mm, the capillary tubes are laid between a first lining and a second lining of the surrounding rocks of the subway tunnel, a waterproof board is laid between the capillary tubes and the second lining, and each of the capillary tubes has a flow rate of 0.05-0.2 m/s.

8. A method for supplying energy from the subway hybrid-energy multifunctional-end-integrated heat pump system according to claim 1, the method comprising turning on the first valve to allow the subway capillary tube heat pump unit to absorb waste heat from the subway tunnel to heat hot water to generate the hot water, turning on the second valve to allow the hot water to enter the hot water storage tank, and turning on the twelfth valve and the seventh circulating water pump; in summer, controlling, by the central processing device, corresponding controllers to turn on the seventh valve, the eighth valve, the ninth valve, and the fifth circulating water pump to allow the air-cooled heat pump unit to supply cold energy to the air conditioner end; controlling, by the central processing device, corresponding controllers to turn on the third circulating water pump, the third valve, and the fourth valve to allow circulating water in the hot water storage tank to flow back to the solar panel and the subway capillary-tube heat pump unit to absorb solar energy and the subway waste heat, when a water temperature at an outlet of the solar panel is greater than or equal to 60° C.; controlling, by the central processing device, the corresponding controllers to turn off the third valve, the fourth valve, and the third circulating water pump to allow the circulating water in the hot water storage tank to flow back to the subway capillary-tube heat pump unit to be heated by the subway waste heat to supply hot water to the hot water supply end, if the water temperature at the outlet of the solar panel is less than 60° C.; in winter, turning on the thirteenth valve, the fourteenth valve, the eighth circulating water pump, and the ninth circulating water pump, and controlling, by the central processing device, the corresponding controllers to turn off the seventh valve, the eighth valve, the ninth valve, and the fifth circulating water pump; controlling, by the central processing device, the corresponding controllers to turn on the third valve, the fourth valve, and the third circulating water pump to allow the circulating water in the hot water storage tank to flow back to the solar panel and the subway capillary-tube heat pump unit to absorb the solar energy and the subway waste heat, when a water temperature at the outlet of the hot water storage tank is less than 60° C. and if the water temperature at the outlet of the solar panel is greater than or equal to 60° C. as monitored by a temperature monitor at the outlet of the hot water storage tank; controlling, by the central processing device, corresponding controllers to turn on the fifth valve, the sixth valve, and the fourth circulating water pump to allow the circulating water in the hot water storage tank to flow back to the air-cooled heat pump unit, the solar panel, and the subway capillary-tube heat pump unit such that the first energy end, the second energy end, and the third energy end jointly supply heat to the air conditioner end, the hot water supply end, the underfloor heating end, and the radiator heating end, if at this point the water temperature at the outlet of the hot water storage tank is still less than 60° C.; controlling, by the central processing device, the corresponding controllers to turn on the fifth valve, the sixth valve, and the fourth circulating water pump and turn off the third valve, the fourth valve, and the third circulating water pump to allow the circulating water to flow back to the air-cooled heat pump unit and the subway capillary-tube heat pump unit such that the first energy end and the third energy end supply heat to a multifunctional end, if the water temperature at the outlet of the solar panel is less than 60° C. as monitored by the temperature monitor at the outlet; in a transition season, controlling, by the central processing device, the corresponding controllers to turn off the seventh valve, the eighth valve, the ninth valve, the thirteenth valve, the fourteenth valve, the fifth circulating water pump, the eighth circulating water pump, and the ninth circulating water pump; controlling, by the central processing device, the corresponding controllers to turn off the third valve, the fourth valve, and the third circulating water pump, if the water temperature at the outlet of the solar panel is less than 60° C. as monitored by the temperature monitor at the outlet, and controlling, by the central processing device, the corresponding controllers to turn on the fifth valve, the sixth valve, and the fourth circulating water pump to allow the circulating water in the hot water storage tank to flow back to the air-cooled heat pump unit and the subway capillary-tube heat pump unit such that the first energy end and the third energy end supply heat, if at this point the water temperature at the outlet of the hot water storage tank is less than 60° C.; controlling, by the central processing device, the corresponding controllers to turn off the fifth valve, the sixth valve, and the fourth circulating water pump to allow the circulating water in the hot water storage tank to flow back to the subway capillary-tube heat pump unit such that the first energy end supplies heat, if at this point the water temperature at the outlet of the hot water storage tank is greater than 60° C.; controlling, by the central processing device, the corresponding controllers to turn on the third valve, the fourth valve, and the third circulating water pump to allow the circulating water in the hot water storage tank to flow back to the solar panel and the subway capillary-tube heat pump unit such that the first energy end and the second energy end supply heat, if the water temperature at the outlet of the solar panel is greater than or equal to 60° C. as monitored by the temperature monitor of the solar panel; and controlling, by the central processing device, the corresponding controllers to turn on the tenth circulating water pump and the fifteenth valve, if a water level of the hot water storage tank is less than a set value.

9. The method according to claim 8, wherein if the water temperature at the outlet of the hot water storage tank is greater than 60° C. as monitored by a temperature monitor at the outlet of the hot water storage tank, the central processing device controls corresponding controllers to turn on the eleventh circulating water pump and the sixteenth valve; and if a water temperature at the outlet of the hot water storage tank is equal to 60° C. as monitored by the temperature monitor at the outlet of the hot water storage tank, the central processing device controls the corresponding controllers to turn off the eleventh circulating water pump and the sixteenth valve.

* * * * *